US012581189B2

(12) United States Patent (10) Patent No.: US 12,581,189 B2

Nilsson (45) Date of Patent: Mar. 17, 2026

(54) METHOD FOR CONTROLLING A CAMERA MONITORING A SCENE

(71) Applicant: Axis AB, Lund (SE)

(72) Inventor: Jesper Nilsson, Lund (SE)

(73) Assignee: AXIS AB, Lund (SE)

( * ) Notice: Subject to any disclaimer, the term of this patent is extended or adjusted under 35 U.S.C. 154(b) by 45 days.

(21) Appl. No.: 18/915,407

(22) Filed: Oct. 15, 2024

(65) Prior Publication Data

US 2025/0168502 A1 May 22, 2025

(30) Foreign Application Priority Data

Nov. 17, 2023 (EP) ..................................... 23210495

(51) Int. Cl.
| | |
|---|---|
| *H04N 23/667* | (2023.01) |
| *H04N 23/71* | (2023.01) |
| *H04N 23/73* | (2023.01) |
| *H04N 23/80* | (2023.01) |

(52) U.S. Cl.
CPC ........... *H04N 23/667* (2023.01); *H04N 23/71* (2023.01); *H04N 23/73* (2023.01); *H04N 23/80* (2023.01)

(58) Field of Classification Search
CPC ...... H04N 23/667; H04N 23/71; H04N 23/73; H04N 23/80; H04N 23/72; H04N 7/183; H04N 23/60; H04N 23/64; H04N 23/74; H04N 23/75
See application file for complete search history.

(56) References Cited

U.S. PATENT DOCUMENTS

| | | | | |
|---|---|---|---|---|
| 10,630,900 | B2 * | 4/2020 | Yu | ........................... H04N 23/70 |
| 10,950,005 | B1 | 3/2021 | Beach et al. | |
| 2010/0079589 | A1 | 4/2010 | Yoshida et al. | |
| 2012/0106795 | A1 * | 5/2012 | Farrer | .................. H04N 23/611 |
| | | | | 382/103 |
| 2012/0147182 | A1 * | 6/2012 | Meyer | .................... G06V 20/52 |
| | | | | 348/143 |
| 2017/0303466 | A1 * | 10/2017 | Grufman | .................. G06T 7/80 |

(Continued)

FOREIGN PATENT DOCUMENTS

| | | |
|---|---|---|
| CN | 106251382 B | 1/2021 |

OTHER PUBLICATIONS

Extended European Search Report mailed on May 24, 2024, received for EP Application 23210495.0, 07 pages.

*Primary Examiner* — Nhan T Tran

(74) *Attorney, Agent, or Firm* — XSENSUS LLP

(57) ABSTRACT

Controlling a camera includes determining a first camera setting for monitoring a scene under a first lighting condition, and a second camera setting for monitoring the scene under a second lighting condition. The method further includes obtaining a reference image that represents the scene under the second lighting condition, as captured in the first camera setting. While monitoring the scene in the first camera setting, detecting a change in the scene from the first to the second lighting condition. The detecting the change includes performing a comparison between first image feature data derived from a first image of the scene captured with the camera set to the first camera setting, after the change from the first to the second lighting condition, and reference image feature data derived from the reference image, to determine that the first image feature data matches the reference image feature data.

15 Claims, 6 Drawing Sheets

(56)    References Cited

U.S. PATENT DOCUMENTS

| | | |
|---|---|---|
| 2019/0379832 A1 | 12/2019 | Topalli |
| 2020/0314313 A1 | 10/2020 | Wang |
| 2022/0272247 A1 | 8/2022 | Citerin et al. |

* cited by examiner

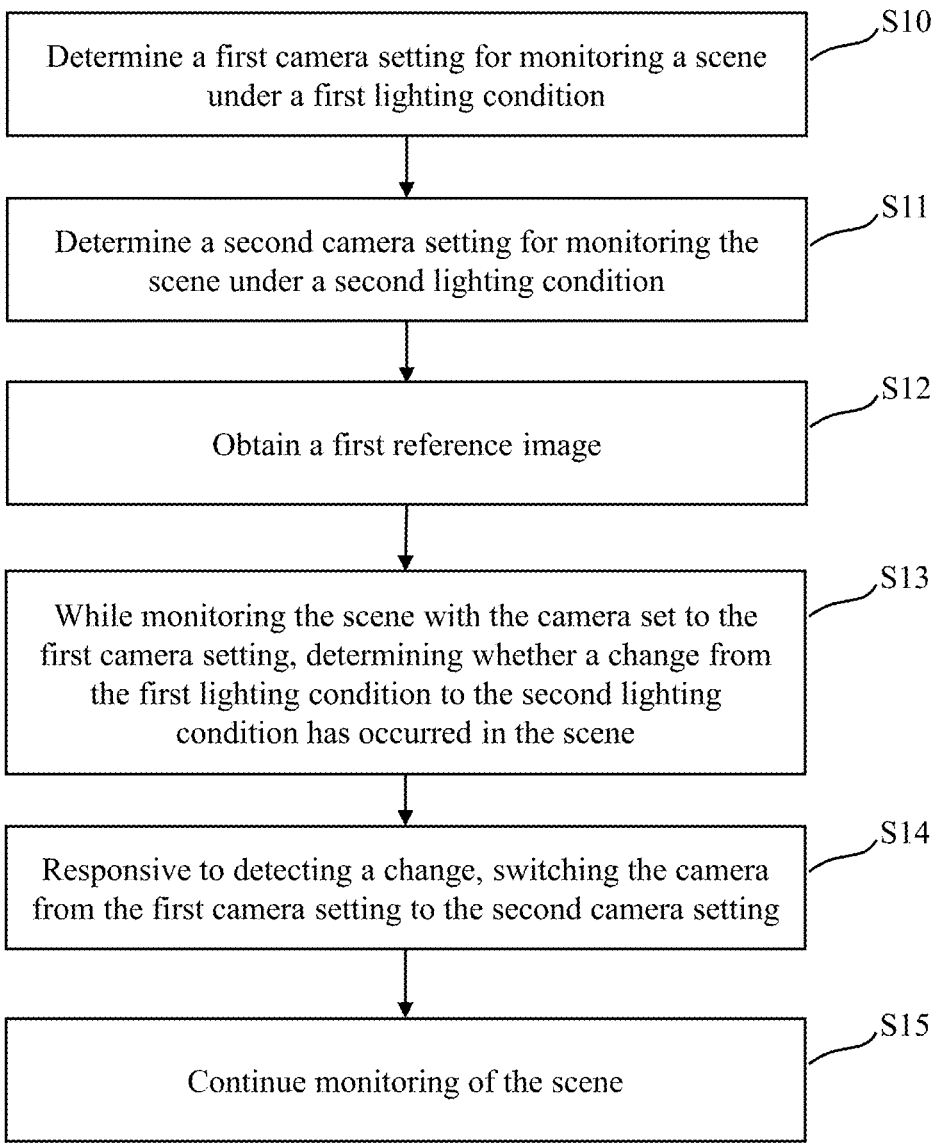

Determine a first camera setting for monitoring a scene under a first lighting condition — S10

Determine a second camera setting for monitoring the scene under a second lighting condition — S11

Obtain a first reference image — S12

While monitoring the scene with the camera set to the first camera setting, determining whether a change from the first lighting condition to the second lighting condition has occurred in the scene — S13

Responsive to detecting a change, switching the camera from the first camera setting to the second camera setting — S14

Continue monitoring of the scene — S15

*Fig. 4*

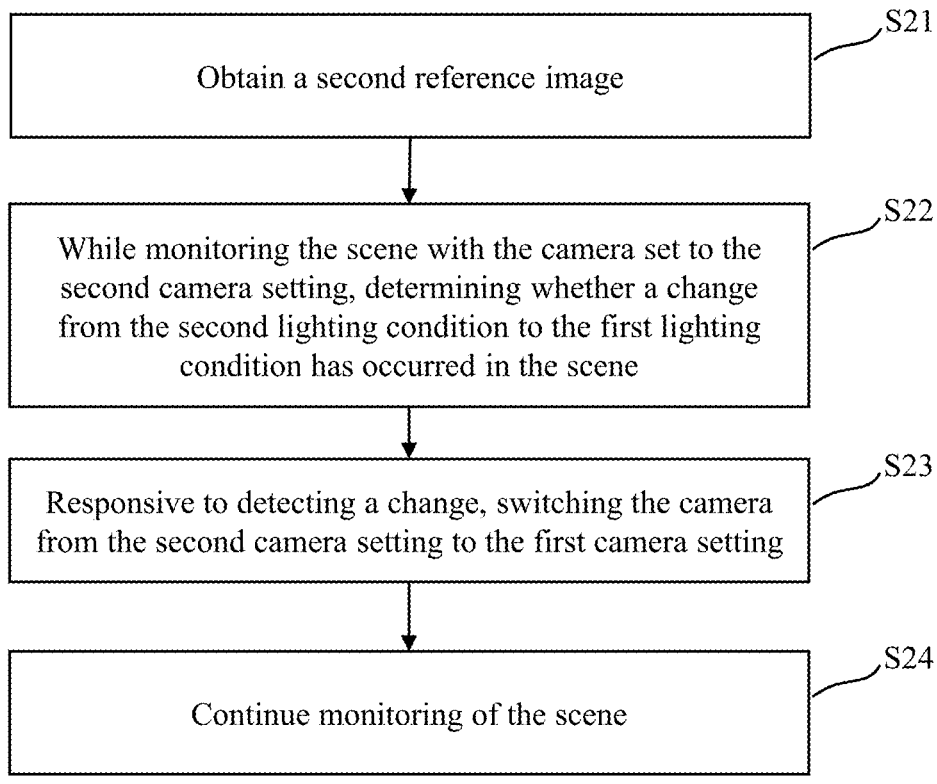

Obtain a second reference image _S21

While monitoring the scene with the camera set to the second camera setting, determining whether a change from the second lighting condition to the first lighting condition has occurred in the scene _S22

Responsive to detecting a change, switching the camera from the second camera setting to the first camera setting _S23

Continue monitoring of the scene _S24

METHOD FOR CONTROLLING A CAMERA MONITORING A SCENE

CROSS-REFERENCE TO RELATED APPLICATION

This application claims priority to European Patent Application No. 23210495.0 filed on Nov. 17, 2023, the entire disclosure of which is incorporated by reference herein.

TECHNICAL FIELD

The present invention generally relates to a method for controlling a camera monitoring a scene.

BACKGROUND

Monitoring cameras used in surveillance applications typically employ exposure algorithms for automatically controlling exposure-related settings of the camera to allow capturing properly exposed images under varying lighting conditions in the monitored scene. In scenes predominantly lit by the sun, such as outdoor scenes, changes in lighting conditions tend to happen at a relatively slow pace such that the exposure algorithm may track the changing lighting conditions in the scene rather well.

However, some scenes, such as a scene in an indoor environment, may be dominated by light which may change both quickly and randomly. Consider as an example an indoor environment such as a room with only a few or no windows, predominantly lit by light sources which may be switched between on and off, and/or by indirect light (artificial or sunlight) which may enter the room through a door which may be opened and closed. In such an environment, the lighting condition may change from relatively dark (e.g. when the light sources are turned off or the door is closed) to relatively bright in a short time (e.g. when the light sources are turned on or the door is opened), and vice versa. The time required for an automatic exposure algorithm to adapt to the changed lighting condition by incremental adjustments of exposure-related settings of the camera (e.g. aperture, shutter speed, ISO value, etc.) may be significant in the context of surveillance applications. In particular, images captured by the camera during this time period may be over- or under-exposed such that objects in the scene (e.g. a person switching the light sources on or off or entering the room through the door) may not be readily distinguished, be it by an operator or by automatic image-based object tracking algorithms. It is further contemplated that images captured in connection with such events may be especially valuable from a monitoring perspective, e.g., by having a potentially high evidence value.

SUMMARY

In view of the above, it is an object of the present invention to provide a method for controlling a camera monitoring a scene which may adapt to a changed lighting condition more rapidly than conventional automatic exposure algorithms. It is further an object to enable a more reliable monitoring of scenes in which lighting conditions may change quickly and unpredictably. These and other objects may be better understood from the following.

Hence, according to a first aspect of the present invention, there is provided a method for controlling a camera monitoring a scene, the method comprising:

determining a first camera setting for monitoring the scene under a first lighting condition, and a second camera setting for monitoring the scene under a second lighting condition different from the first lighting condition;

obtaining a reference image, wherein the reference image represents the scene under the second lighting condition, as captured with the camera set to the first camera setting;

while monitoring the scene with the camera set to the first camera setting, detecting a change in the scene from the first lighting condition to the second lighting condition, wherein detecting the change from the first to the second lighting condition comprises performing a comparison between:

first image feature data derived from a first image of the scene captured with the camera set to the first camera setting, after said change from the first to the second lighting condition, and reference image feature data derived from the reference image, to determine that the first image feature data matches the reference image feature data; and responsive to detecting the change, switching the camera from the first camera setting to the second camera setting and continuing monitoring of the scene.

By determining the first camera setting (which is a camera setting suitable for monitoring the scene under the first lighting condition), and the second camera setting (which is a camera setting suitable for monitoring the scene under the second lighting condition), and obtaining a reference image representing the scene under the second lighting condition as captured with the camera settings to the first and thus "wrong" camera setting, a change from the first to the second lighting condition may be rapidly and reliably detected. In response, the camera settings may be directly switched from the first to the second camera setting, without needing to rely on an iterative and gradual change by a conventional automatic exposure algorithm.

The reference image (also referred to as "the first reference image" in the following) may hence in a sense be considered as a "shortcut image", providing a shortcut from the first to second camera setting.

The method of the first aspect involves an image feature-based comparison between the reference (shortcut) image and the first image captured after the change from the first to the second lighting condition. Since the reference image represents the scene under the second lighting condition, as captured using the first camera setting, the first image feature data (derived or extracted from the first image) may closely match the reference image feature data (derived or extracted from the reference image) upon occurrence of the second lighting condition. This facilitates reliable detection of whether to trigger the change of the switch from the first to second camera setting, while mitigating a risk of switching to the second camera setting when the second lighting condition is not present. That is, the method may provide a reduced risk of confusing a further lighting condition, different from the first and second lighting conditions, with the second lighting condition and thus inadvertently trigger a change to the second camera setting (which may be unsuitable for the further lighting condition).

It is here noted that the term "first" in "the first image" here is used as a label for the image captured after the change from the first to the second lighting condition, and should not be construed as "the first image" necessarily being the temporally first image in the sequence of images captured after the change from the first to the second lighting condition. That said, provided the first image indeed is the temporally first image in a sequence of images captured after said change from the first to the second lighting condition, the changed lighting condition may be detected with less delay, and thus the camera setting may be switched more quickly.

The first image may be a frame of a sequence of frames captured with the camera set to the first capturing setting during the monitoring of the scene. The sequence of frames may in particular be a video sequence.

The reference image may typically be captured of the scene under the second lighting condition, with the camera set to the first camera setting. The reference image may hence precisely reflect the scene under the second lighting condition as captured by the camera when set to the first camera setting.

In some embodiments, the method further comprises deriving the reference image feature data and storing the reference image feature data, wherein performing the comparison comprises comparing the first image feature data to the stored reference image feature data. Hence, the reference image feature data may be derived and stored once, rather than being derived upon each time a comparison with a captured image is to be performed.

In some embodiments, the first and reference image feature data comprise exposure-related data. Exposure-related data may be a particularly relevant metric for the comparison with the aim of detecting a changed lighting condition.

The exposure-related data of the first image feature data and of the reference image feature data may each comprise statistics of pixel values derived from the first image and the reference image, respectively. The statistics may comprise one or more of: a representative pixel value for the first image or the reference image, such as an average or median pixel value, a contrast, a frequency distribution of pixel values. Either of these statistics, in isolation or in combination, may be useful for detecting a changed lighting condition in the scene.

In some embodiments, the first and reference image feature data comprise pixel values of spatially corresponding pixels of the first and reference image. Hence, the comparison of the first and reference image feature data may amount to comparing pixel values of spatially corresponding pixels derived from the first image and the reference image.

In some embodiments, the first image feature data and the reference image feature data are derived from the first image and the reference image, respectively, by down-sampling the respective image and extracting the respective image feature data from the respective down-sampled image. This reduces the amount of data which need to be processed and stored, and hence facilitate a computationally efficient implementation.

In some embodiments, the scene comprises one or more regions of interest, each depicted in a respective one of one or more portions of the first image and the reference image, and wherein the first and the reference image feature data are derived from at least the one or more portions of the first image and the reference image, respectively.

By basing the detection on image feature data derived from portions of the first image and the reference image depicting one or more regions of interest, the detection may take into account the portions of the images which are of relatively greater interest in the given monitoring scenario. A "region of interest" of the scene and a respective "portion" of the first image and the reference image are here to be understood respectively as a (strict) sub-region of the scene and a (strict) sub-set of the first image and the reference image.

For instance, the first and reference image feature data may comprise exposure-related data, wherein the exposure-related data of the first image feature data and the exposure-related data of the reference image feature data may comprise statistics of pixel values derived from respective and spatially corresponding portions of the first image and the reference image, respectively (i.e. one or more portions depicting the one or more regions of interest of the scene). The comparison of the first and reference image feature data may thus comprise comparing statistics of pixel values derived from spatially corresponding portions of the first image and the reference image, depicting a region of interest of the scene.

A further effect of considering one or more regions of interest for detecting the change from the first to the second lighting condition, is that in many scenes, the second lighting condition need not evenly impact an illumination level in the entire scene. Thus, the image feature data may be derived from one or more image portions in which a changed illumination level may impact the reliability of the monitoring.

The first and the reference image feature data may be derived only from the one or more portions of the first image and the reference image, respectively. That is, portions of the first image and the reference image not depicting a region of interest may be excluded from the image feature data and the comparison. That is, regions of the scene which are not of interest in the given monitoring scenario may be disregarded for the purpose of detecting the changed lighting condition.

The one or more regions of interest may comprise an object, such as a door opening or artificial lighting, having a first state and a second state (e.g. a lower and higher luminance state), wherein the first state is associated with the first lighting condition and the second state is associated with the second lighting condition. A door opening as well as artificial lighting represent typical regions of interest in a scene which abruptly may change luminance state and thus cause a changed lighting condition in the scene. A door may further be of particular interest from a monitoring perspective as this is a location in the scene from which people may enter and exit the scene.

In some embodiments, the first and second lighting condition may correspond, respectively, to a first and a second steady-state lighting condition with different luminance levels. Correspondingly the first and the second camera setting may be respective settings of the camera suitable for the first and the second steady-state lighting condition, respectively. The first and the second camera setting may thus be respective "resting settings" or "resting modes", representing relatively stable or stationary settings of the camera. In the example relating to indoor environments discussed in the background, the first steady-state lighting conditions may correspond to the light sources being turned off or the door being closed while the second steady-state lighting conditions may correspond to the light sources being turned on or the door being open, or vice versa.

In some embodiments, the first and second camera settings comprise a setting of one or more exposure-related control parameters of the camera.

The first and second camera settings may each comprise a setting of one or more of: shutter speed, aperture, ISO value, camera lighting (visible or infrared (IR)), and an IR filter state. Either of these exposure-related control parameters of the camera, in isolation or in combination, allows controlling an exposure level upon capturing of an image.

In some embodiments, the method further comprises:

obtaining a second reference image, wherein the second reference image represents the scene under the first lighting condition, as captured with the camera set to the second camera setting;

while monitoring the scene with the camera set to the second camera setting, detecting a change in the scene from the second lighting condition to the first lighting condition, wherein detecting said change from the second to the first lighting condition comprises performing a comparison between:

second image feature data derived from a second image of the scene captured with the camera set to the second camera setting, after said change from second to the first lighting condition, and second reference image feature data derived from the second reference image, to determine that the second image feature data matches the second reference image feature data; and responsive to detecting the change, switching the camera from the second camera setting to the first camera setting and continuing monitoring of the scene.

A second reference or "shortcut" image may hence be used to, in a corresponding manner, rapidly and reliably detect a change from the second to the first lighting condition and, in response, directly switch from the second to the first camera setting, without relying on an iterative and gradual change by a conventional automatic exposure algorithm.

The above discussion of the first image feature data and the (first) reference image feature data applies correspondingly to the second image feature data and the second reference image feature data.

The second reference image may typically be captured of the scene under the first lighting condition, with the camera set to the second camera setting. The second reference image may hence precisely reflect the scene under the first lighting condition as captured by the camera when set to the second camera setting.

According to a second aspect of the present invention, there is provided a camera comprising a processing device configured to perform the method of the first aspect or any embodiments or examples thereof.

According to a third aspect of the present invention, there is provided a computer program product comprising computer program code portions configured to perform a method for controlling a camera monitoring a scene, when executed by a processing device, the method comprising:

determining a first camera setting for monitoring the scene under a first lighting condition, and a second camera setting for monitoring the scene under a second lighting condition different from the first lighting condition;

obtaining a reference image, wherein the reference image represents the scene under the second lighting condition, as captured with the camera set to the first camera setting;

while the camera is set to the first camera setting and monitors the scene, detecting a change in the scene from the first lighting condition to the second lighting condition, wherein detecting said change from the first to the second lighting condition comprises performing a comparison between:

first image feature data derived from a first image of the scene captured with the camera set to the first camera setting, after said change from the first to the second lighting condition, and reference image feature data derived from the reference image, to determine that the first image feature data matches the reference image feature data; and responsive to detecting the change, causing the camera to switch from the first camera setting to the second camera setting and continue monitoring of the scene.

The second and third aspects feature the same or equivalent benefits as the first aspect. Any features described in relation to the first aspect, may have corresponding features in the second and third aspects, and vice versa.

BRIEF DESCRIPTION OF THE DRAWINGS

This and other aspects of the present invention will now be described in more detail, with reference to the appended drawings showing embodiments of the present invention.

FIG. 4 is a flow chart of a method for controlling a camera monitoring a scene comprising detecting a change from a first lighting condition to a second lighting condition.

FIG. 6 is a flow chart of a method for controlling a camera monitoring a scene comprising detecting a change from a second lighting condition to a first lighting condition.

DETAILED DESCRIPTION

Figure 1:
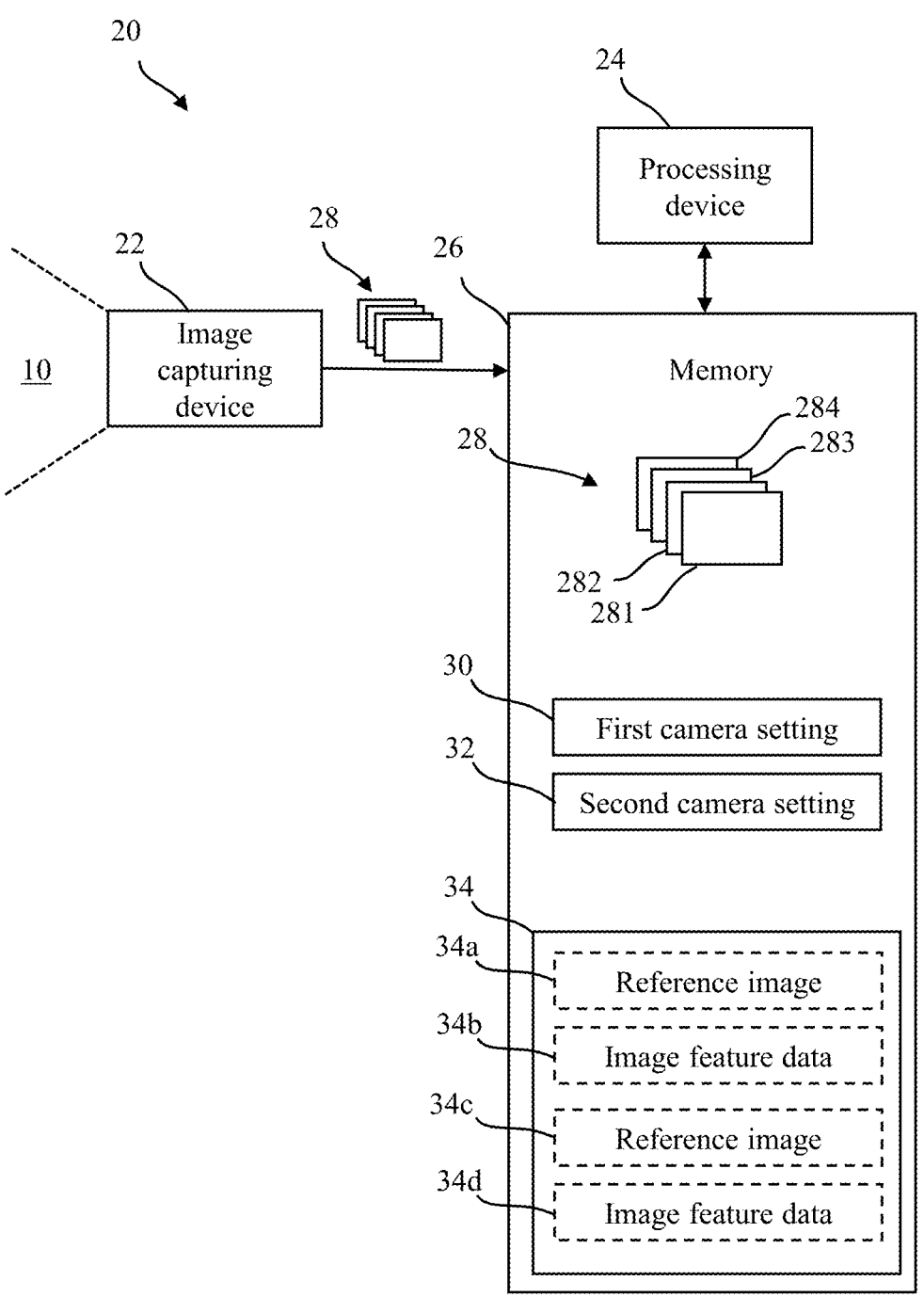
FIG. 1 schematically shows a block diagram of an implementation of a camera.

FIG. 1 is a schematic block diagram of a camera 20 in which the methods of the present disclosure may be implemented. The camera 20 may be a monitoring or surveillance camera. The camera 20 comprises an image capturing device 22, comprising e.g., an image sensor and optics. The camera 20 monitors a scene 10 by capturing, using the image capturing device 22, images or frames, thereby providing a sequence of images or frames 28 of the scene 10. The images 28 may be captured at a predetermined or variable frame rate suitable for the given monitoring application. The sequence of images 28 may in particular form frames of a video sequence of the scene 10.

The camera 20 further comprises a processing device 24 and a memory 26. The memory 26 may be associated with the processing device 24, e.g. by being coupled to or comprised in the processing device 24. The processing device 24 is configured to receive and process the captured sequence of images 28. As indicated in FIG. 1, the sequence of images 28 (e.g., comprising images 281-284, etc.) may be stored in the memory 26 wherein the processing device 24 may retrieve and process the images from the memory 26.

A method for controlling the camera 20, as set out in the following, may be implemented in both hardware and software. In a software implementation, the processing device 24 may be realized in the form of one or more processors, such as one or more central processing units, which in association with computer program code instructions stored on a (non-transitory) computer-readable medium, such as a non-volatile memory, causes the processing device 24 to carry out the method steps for controlling the camera 20. Examples of non-volatile memory include read-only memory, flash memory, ferroelectric RAM, magnetic computer storage devices, optical discs, and the like. In a hardware implementation, the processing device 24 may instead be realized by dedicated circuitry configured to implement the method steps for controlling the camera 20. The circuitry may be in the form of one or more integrated circuits, such as one or more application specific integrated circuits (ASICs) or one or more field-programmable gate arrays (FGPAs). It is to be understood that it is also possible to have a combination of a hardware and a software implementation, meaning that some method steps may be implemented in dedicated circuitry and others in software.

Figure 2:
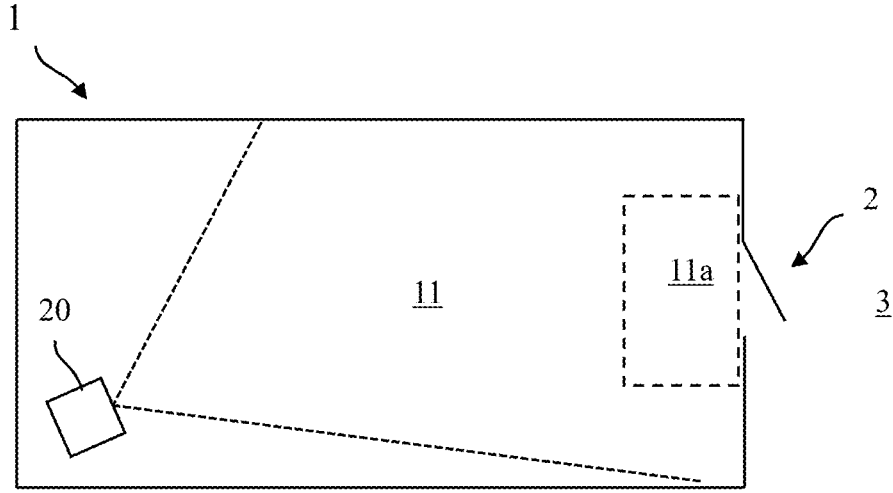
FIG. 2 shows a first example scene.

FIG. 2 shows an example indoor space in the form of a room 1. A camera 20 is installed (i.e. arranged) in the room 1 to monitor a scene 11 of the room 1. As indicated by the dashed lines extending from the camera 20, the scene 11 corresponds to the part of the room 1 within the field of view of the camera 20. The room 1 comprises a door 2 arranged in a doorway connecting the room 1 to an adjacent space 3. The adjacent space 3 may be an adjoining room (e.g. a corridor) or an outdoor space. Assuming that the room 1 is unlit, only dimly lit by artificial light sources, or by stray light entering the room 1 through one or more small windows of the room 1, the lighting condition of the scene 11 may be relatively dark or dim when the door 2 is closed. Assuming further that the adjacent space 3 is brightly lit (e.g. by sunlight or by bright artificial lighting in the space 3), the lighting condition of the scene 11 may be relatively bright when the door 2 is open.

Figure 3:
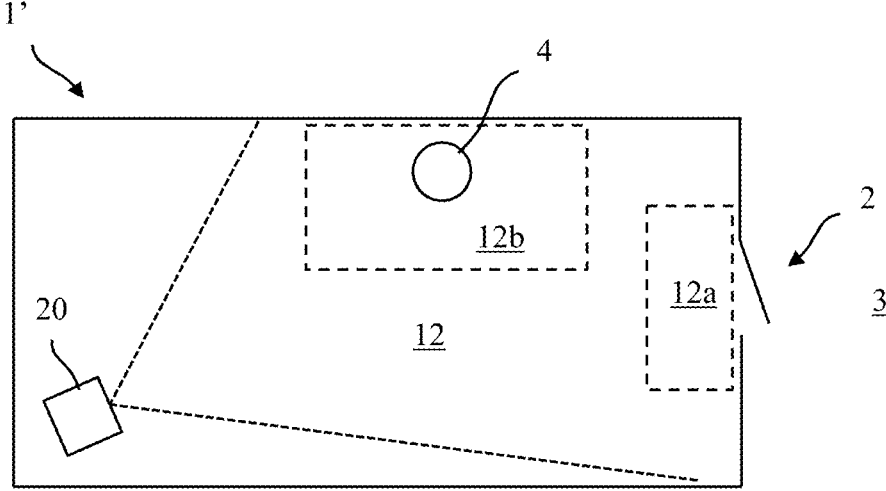
FIG. 3 shows a second example scene.

FIG. 3 shows a further example indoor space in the form of a room 1'. Reference sign 12 represents the scene of the room 1' monitored by the camera 20. FIG. 3 differs from FIG. 2 in that the adjoining space 3 is assumed not to be brightly lit. Hence, the state of the door 2 (i.e. open or closed) is assumed to not have any substantial impact on the illuminance level in the room 1' and the scene 12. Instead, the room 1' may be predominantly lit by an artificial lighting 4 (e.g., comprising one or more lighting devices) which may be switched on or off, e.g., by a light switch disposed inside or outside the room 1'. The lighting condition of the scene 12 may thus be relatively dark or dim when the artificial lighting 4 is switched off, and relatively bright when the artificial lighting 4 is switched on.

The scenes 11 and 12 are hence examples of scenes in which either a first lighting condition or a second lighting condition may exist. The first lighting condition may correspond to a lower luminance level in the scene 11, 12 and the second lighting condition may correspond to a higher luminance level in the scene 11, 12, or vice versa. In both FIG. 2 and FIG. 3, the first and the second lighting condition may correspond, respectively, to a first and a second steady-state lighting condition with different luminance levels. That is, while the door 2 is closed or the artificial lighting 4 is off, the luminance level in the respective scenes 11, 12 may be relatively stationary, and similarly while the door 2 is open or the artificial lighting 4 is on.

Furthermore, the door 2 and the artificial lighting 4 are examples of objects in the respective monitored scenes 11, 12, having a first state and a second state (e.g. open/closed, on/off) which are associated with different lighting conditions in the scene. Hence, there may exist a first lighting condition in the scene 11 when the door is in a closed state and a second lighting condition when the door 2 is in an open state, or vice versa. Correspondingly, there may exist a first lighting condition in the scene 12 when the artificial lighting 4 is in an off state and a second lighting condition when the artificial lighting 4 is in an on state, or vice versa.

A method for controlling the camera 20, as shown in FIG. 1, will now be described with reference to the flow charts of FIG. 4-5. The scene 10 monitored by the camera 20 may for instance be either of the scenes 11 and 12 of FIG. 2-3.

At S10, the processing device 24 of the camera 20 determines a first camera setting suitable for monitoring the scene 10 under a first lighting condition, and, at S11, a second camera setting suitable for monitoring the scene 10 under a second lighting condition different from the first lighting condition. The processing device 24 may as shown in FIG. 1 store the first camera settings 30 and the second camera setting 32 in the memory 26, for later retrieval. For simplicity, it will in the following be assumed that the first lighting condition corresponds to the lower luminance level in the scene 10 and the second lighting condition corresponds to the higher luminance level in the scene 10. However, the opposite may equally well apply.

The first and second camera settings may be determined using an automatic exposure algorithm when the scene 10 is under the first lighting condition and the second lighting condition, respectively. The automatic exposure algorithm may be implemented in a conventional manner. For instance, the automatic exposure algorithm may be configured to control a setting of one or more exposure-related control parameters of the camera 20 to obtain a target exposure. Examples of exposure-related control parameters include shutter speed, aperture, ISO value, camera lighting (visible or IR), and an IR filter state. The automatic exposure algorithm may be configured to determine a current exposure level for the scene 10 and adjust (e.g., incrementally and/or gradually) the setting of the one or more exposure-related control parameters to reduce a difference between a predetermined target exposure level and the current exposure level.

The first and second camera settings may be determined as part of a configuration or calibration step of the method. That is, the scene 10 may intentionally be caused to present the first lighting condition (e.g., by closing the door 2 or switching the artificial lighting 4 off) wherein the processing device 24, using the automatic exposure algorithm, may determine the first camera setting suitable for the first lighting condition. The scene 10 may further be caused to present the second lighting condition (e.g., by opening the door 2 or switching the artificial lighting 4 on) wherein the processing device 24, using the automatic exposure algorithm, may determine the second camera setting suitable for the second lighting condition.

The first and second camera settings may also be determined during monitoring of the scene 10. That is, the processing device 24 may over time (e.g., hours, days or months) record a frequency distribution of camera settings determined by the automatic exposure algorithm. For a scene with a first and a second steady-state lighting condition with different luminance levels, such as the scenes 11 and 12, it is contemplated that two different camera settings, or two different groups of similar camera settings, may be identified in the frequency distribution. The two different camera settings, or a respective average of the groups of similar camera settings, may accordingly be determined as the first and the second camera setting.

While S10 and S11 are shown as subsequent steps, it is noted that S10 and S11 may be performed in any order. In case the first and second camera settings are determined over time, steps S10 and S11 may even be performed in a staggered or interleaved fashion.

At S12, the processing device 24 obtains a (first) reference image of the scene 10. The reference image may typically be captured by the camera 20 (more specifically by the image capturing device 22 thereof) being set to the first camera setting, when the scene 10 is under the second lighting condition (e.g., the door 2 in FIG. 2 being open or the artificial lighting 4 in FIG. 3 being switched on). That is, the reference image may be captured by the camera 20 when the scene 10 is under the second lighting condition, using the first camera setting. The reference image may hence precisely reflect the scene 10 under the second lighting condition as seen or imaged by the camera 20 when set to the first camera setting.

The reference image may, like the first and second camera settings, be obtained as part of a configuration or calibration step of the method. That is, the scene 10 may intentionally be caused to present the second lighting condition, the camera 20 may be set to the first camera setting (thus overriding an automatic exposure algorithm of the camera 20), and an image of the scene 10 may be captured by the camera 20. The image may be determined as the reference image. It is also possible to capture a plurality of images of the scene 10 using the first camera setting and determine the reference image as an average image of the plurality of images. It is further envisaged that the reference image alternatively may be obtained as an image of the scene 10 captured by another but similar camera (e.g. by a camera installer when deploying the camera for monitoring the scene 10) using corresponding camera settings, and then transferred to the memory 26 of the camera 20.

As will be further described below, and as shown in FIG. 1, the reference image (possibly down-sampled) 34a, and/or image feature data 34b derived from the (down-sampled) reference image may be stored in the memory 26 as reference data 34, for subsequent use in the method.

At S13, the camera 20 proceeds to monitor the scene 10. During the monitoring, the camera 20, by the image capturing device 22, captures a temporal sequence of images 28 of the scene 10. It is here assumed that the scene 10 is under the first lighting condition (e.g. the door 2 in FIG. 2 is closed or the artificial lighting 4 in FIG. 3 is switched off, such that the scene 11 or 12 is relatively dim or dark) and that the camera 20 is set to the first camera setting (i.e. according to the first camera setting 30 stored in the memory 26). The images 28 captured of the scene 10 may thus at this stage be properly exposed. During the monitoring, the processing device 24 determines whether a change from the first lighting condition to the second lighting condition has occurred in the scene 10. The determination may be made at a same rate as the frame rate at which the images 28 are captured to allow a change to be rapidly detected.

Responsive to not detecting a change from the first to the second lighting condition, the monitoring may continue using the first camera setting.

Responsive to detecting a change from the first to the second lighting condition, the processing device 24, at S14, switches the camera 20 from the first camera setting to the second camera setting. The processing device 24 may retrieve the second camera setting 32 from the memory 26 and control or set each parameter of the camera 20 in accordance with the corresponding parameter of the second camera setting 32.

At S15, after switching the camera 20 to the second camera setting, the camera 20 continues monitoring the scene 10. As the scene 10 now is under the second lighting condition the images 28 captured of the scene 10 may thus be properly exposed.

Figure 5:
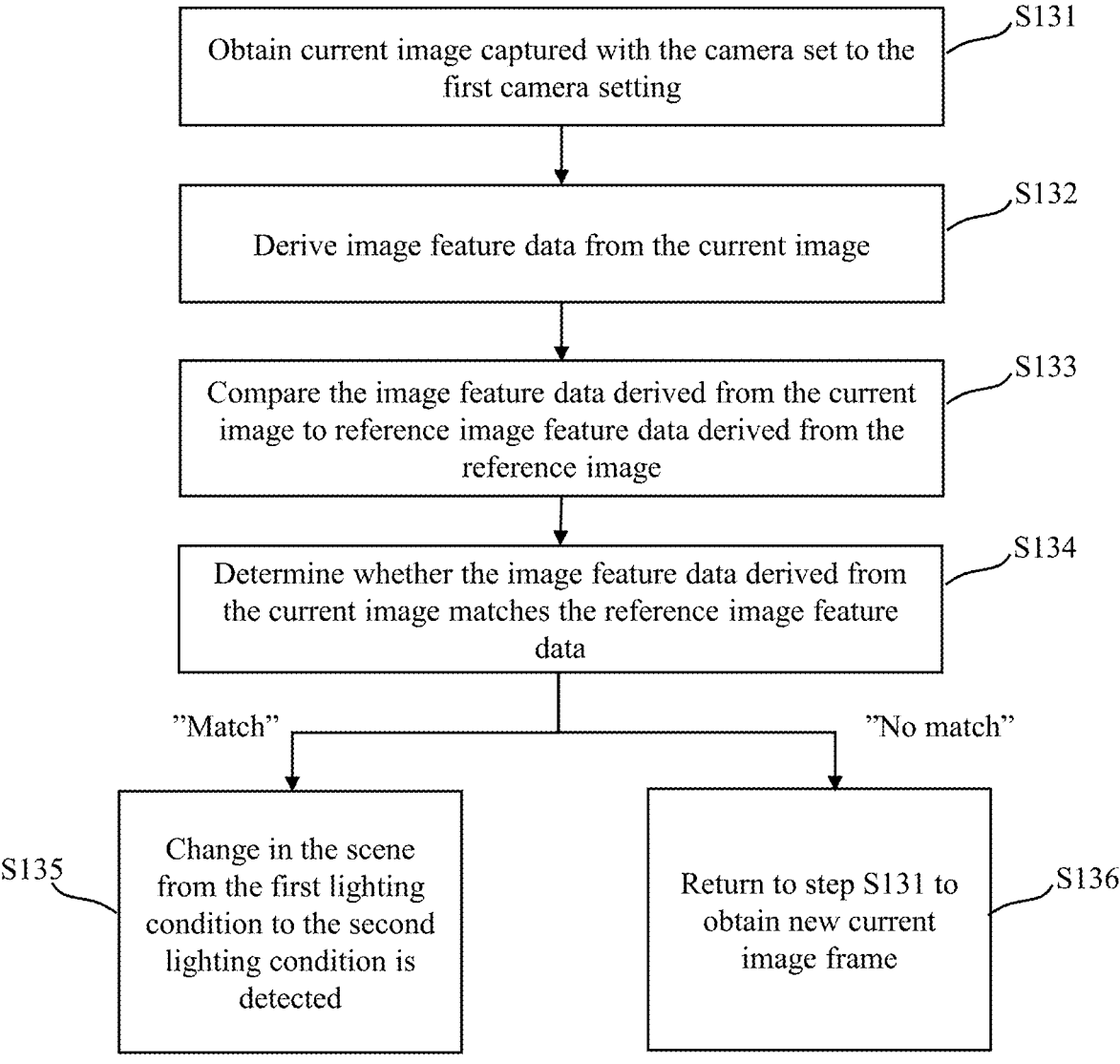
FIG. 5 is a flow chart of method steps for detecting a change from a lighting condition in the scene which may form part of the method of FIG. 4.

FIG. 5 shows method steps for detecting a changed lighting condition in the scene, which may be performed as part of step S13 of FIG. 4. The method steps of FIG. 4 may be performed iteratively, for each image of the sequence of images 28 captured by the camera 20.

At S131, the processing device 24 obtains a current image captured with the camera 20 set to the first camera setting.

At S132, the processing device 24 derives image feature data from the current image.

At S133, the processing device 24 compares the image feature data derived from the current image (interchangeably "the current image feature data") to (first) reference image feature data derived from the (first) reference image.

At S134, the processing device 24 determines whether the current image feature data matches the reference image feature data.

The reference image feature data may have been previously derived from the (down-scaled) reference image and stored as reference image feature data 34b in the memory 26 in connection with obtaining the reference image. In this case, the reference image feature data 34b may be retrieved from the memory 26 and compared to the current image feature data. In case the (possibly down-scaled) reference image 34a has been stored in the memory 26 (e.g., and not the reference image feature data), the processing device 24 may prior to the comparison derive the reference image feature data from the stored reference image 34a and then compare the derived reference image feature data to the current image feature data.

In response to determining that the current image feature data does not match the reference image feature data, the method proceeds according to the "No match" branch of FIG. 5 and thus, at S136, returns to S131 to obtain a next image captured with the camera 20 set to the first camera setting and then performs steps 132-134 using the next image as the current image.

In response to determining that the current image feature data does match the reference image feature data, the method proceeds according to the "Match" branch of FIG. 5 and thus the processing device 24, at S135 determines that a change in the scene 10 from the first lighting condition to the second lighting condition has been detected. The method thereafter proceeds to step S14 of FIG. 4 to switch the camera 20 to the second camera setting.

The comparison between the current image feature data and the reference image feature data may comprise comparing the current image feature data and the reference image feature data to provide a similarity score (equivalently "matching score"), and determining that the current image feature data matches the reference image feature data upon the similarity score exceeding a similarity threshold. The similarity threshold may be a predetermined threshold set to provide a desired tolerance for the comparison.

With reference to the scene 11 of FIG. 2, the method of FIG. 5 may proceed according to the "No match" branch as long as the door 2 remains closed and hence the first lighting condition is maintained in the scene 11. However, if the door 2 at some time instant during the monitoring is opened the lighting condition in the scene 11 will change from the first to the second lighting condition. Hence, the sequence of images 28 will comprise an image of the scene 11 under the first lighting condition (closed door 2) captured using the first camera setting. With reference to FIG. 1, this image may for instance be image 281. The sequence of images 28 will further comprise a subsequent image of the scene 11 under the second lighting condition (open door 2) captured using the first camera setting. This subsequent image is thus captured under the same lighting condition and using the same camera settings as the reference image and will hence match reference image to a high degree, such that the change from the first to the second lighting condition may be detected. The subsequent image may be denoted "first image" and may in line with the preceding discussion hence be a temporally first image captured after the change from the first to the second lighting condition, or correspond to or at least be an image captured within a relatively short time window after the change from the first to the second lighting condition (e.g., with a length corresponding to a relatively short sequence of frames, such as within 20 frames or less, 10 frames or less or 5 frames or less), to reduce a delay of detecting the change to the second lighting condition. With reference to FIG. 1, the subsequent/first image may for instance be image 282 consecutive to image 281, or a subsequent image to image 281 such as image 283 or 284.

Various types of image feature data may be derived and used for the comparison. Reference will in the following be made to current image feature data and reference image feature data, wherein it is to be understood that the current image feature data relates to image feature data derived from a current image (such as the "first" image) and the reference image feature data is derived from the (first) reference image.

The current and reference image feature data may comprise exposure-related data. The exposure-related data may comprise statistics of pixel values derived from the current image and the reference image, respectively. That is, the processing device 24 may process the current image and the reference image to derive respective pixel value statistics therefrom.

The processing device 24 may for example derive a representative pixel value for each of the current image or the reference image, such as an average or median pixel value. Further examples include a maximum pixel value or a mode (i.e. a most common) of pixel values of the respective image.

As another example, the processing device 24 may derive a respective contrast value for the current image and reference image. Various contrast metrics are possible such as a luminance difference (e.g., a difference between a maximum and a minimum pixel value of the respective image) divided by an average luminance of the respective image, or a root mean square (RMS) contrast for the respective image (e.g., corresponding to a standard deviation of the pixel values in the respective image).

As another example, the processing device 24 may derive a frequency distribution of pixel values for the respective image. By "frequency distribution of pixel values" is here meant a statistical distribution indicative of the number of times different pixel values (or pixel intensities) occur in the respective image. The frequency distribution may also be referred to as a histogram. The frequency distribution may indicate either an absolute frequency or a relative frequency of the pixel values. The frequency distribution may be "binned", i.e. the frequency may be indicated for a number of bins (i.e. classes or sub-ranges) of pixel values defined over the range of pixel values.

In the preceding examples, the pixel values may typically refer to the luminance values of the pixels. However, in case of color images the pixel values may also refer to values of a color channel (e.g. either of the RGB components of an RGB-encoded image or either of the chroma components of an YCbCr-encoded image), or an average (optionally weighted) combination of two or more components.

For any of these examples of exposure-related image feature data, the processing device 24 may perform a comparison between the current image feature data and the reference image feature data to determine a similarity score. The similarity score may be determined by computing a distance between the current image feature data and the reference image feature data, such as a distance between respective representative pixel values, contrast values, or frequency distributions. The distance may be determined using any suitable conventional distance metric, such as a Euclidian distance. In case of a frequency distribution, the distance may be based on a difference frequency distribution determined by computing a pixel value-wise difference between the frequency distributions. The current image feature data may be determined to match the reference image feature data responsive to the distance metric being less than a predetermined similarity threshold.

The current and reference image feature data may alternatively comprise pixel values of spatially corresponding pixels of the current image and the reference image. Hence, the comparison of the current and reference image feature data may amount to a pixel-by-pixel comparison of spatially corresponding pixels derived from the current image and the reference image to determine a distance between the pixels, such as a Euclidian distance. A similarity score may be determined as a Mean Squared Error (MSE) between the pixel values. The current image feature data may be determined to match the reference image feature data responsive to the distance metric, or the MSE, is less than a predetermined similarity threshold.

The processing device 24 may determine one or more of the aforementioned types of image feature data. If two or more types of image feature data are determined, the processing device 24 may determine a composite similarity score, e.g. by determining the MSE from the differences between the respective types of image feature data. The current image feature data may be determined to match the reference image feature data responsive to the distance metric, or the MSE, is less than a predetermined (combined) similarity threshold. Different types of image feature data may be differently weighted when determining the composite similarity score.

The scene 10 monitored by the camera 20 may include regions of different relative interest, from a monitoring perspective. For instance, some regions of the scene may be of little or no interest at all, e.g. since the region includes an impassable structure preventing movement of people through the region, or because entry into the region is possible only via another region which accordingly may be attributed a higher interest. On the other hand, some regions may be of relatively greater interest, such as an entry point of an interior space (e.g. a doorway) or a region comprising an object or structure which is not be accessed. A region of the latter type may be considered to represent a region of interest (ROI) of a scene.

With reference to FIG. 2, a region 11a of the scene 11 adjacent the door 2 may represent a ROI as this is a point of entry and exit to the room 1. Furthermore, the region 11a may represent a ROI as it may be the region of the scene 11 in which the greatest change in illuminance level may be expected upon opening or closing of the door 2. If a person opens the door 2 to enter the room 1, the lighting condition in the scene 11 will change from the first to the second lighting condition. This may result in images captured directly after the door 2 has been opened being overexposed.

This applies in particular to the portion of the captured images depicting the ROI 11*a*, thus making tracking and/or identification of a person entering the room 1 difficult.

With reference to FIG. 3, the scene 12, in addition to a first ROI 12*a* adjacent the door 2, includes a second ROI 12*b* surrounding the artificial lighting 4. The region 12*b* may represent a ROI as the region 12*b*, due to its proximity to the artificial lighting 4, may be relatively well lit when the artificial lighting 4 is on. Additionally, the region 12*b* may represent a ROI as it may be desirable to be able to spot attempts to tamper with the artificial lighting 4. Additionally, a lighting switch for the artificial lighting 4 may be located in the ROI 12*b*. Furthermore, the region 12*b* may represent a ROI as it may be the region of the scene 11 in which the greatest change in illuminance level may be expected upon opening or switching the artificial lighting 4 on. It may hence be desired to ensure a proper exposure in the portion of the captured images depicting the ROI 12*b*, in addition to the portion depicting the ROI 12*a*.

The method for controlling the camera 20 may be adapted to take into account that the scene 10 may comprise one or more ROIs. Accordingly, the method may further comprise determining, for each ROI in the scene 10, a portion in each captured image depicting the respective ROI. The portion may be determined by obtaining pixel coordinates for the portion depicting each ROI. The pixel coordinates may be received as input by an installer during installation of the camera 20, or received as user input after installation via a user interface of a camera monitoring software (e.g. over a network connected to the camera 20). An image portion depicting a ROI may in the following be referred to as a "ROI portion".

Figure 7:
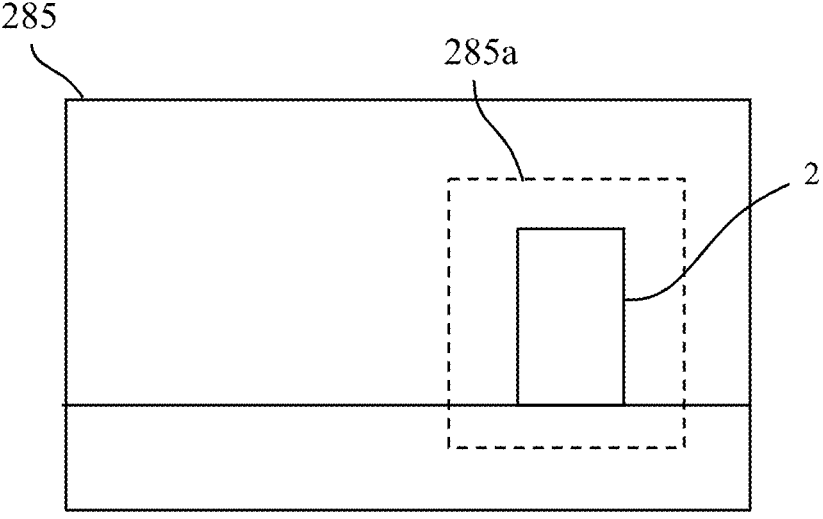
FIG. 7 shows a schematic example of an image depicting the first example scene of FIG. 2.
Figure 8:
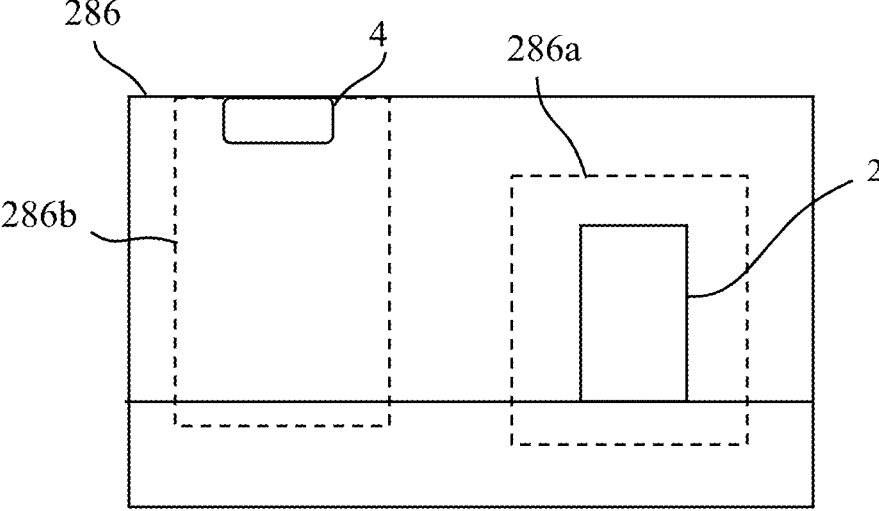
FIG. 8 shows a schematic example of an image depicting the second example scene of FIG. 3.

FIG. 7 is a schematic example image 285 of the scene 11 of FIG. 2, captured by the camera 20. The image 285 comprises a ROI portion 285*a* depicting the ROI 11*a* including the door 2. FIG. 8 is a schematic example image 286 of the scene 12 of FIG. 3, captured by the camera 20. The image 286 comprises a first ROI portion 286*a* depicting the ROI 12*a* including the door 2, and a second ROI portion 286*b* depicting the ROI 12*b* including the artificial lighting 4. Either of the images 285, 286 are representative of any image of the sequence of images 28 captured by the camera 20 during monitoring, as well as the reference image.

Having determined the ROI portion(s) (e.g., 285*a* or 286*a-b*), the processing device 24 may derive the current and reference image feature data from the ROI portion(s) of the current image and the reference image, respectively. For instance, the processing device 24 may determine respective exposure-related data for each ROI portion (e.g. 285*a* or 286*a-b*) of each of the current image and the reference image. For instance, the processing device 24 may determine for each ROI portion, a respective representative pixel value, a respective contrast value, and/or a respective histogram. The processing device 24 may additionally, for each ROI portion, perform a pixel-wise comparison of spatially corresponding pixels of corresponding ROI portions of the current image and the reference image. If the images comprise two or more ROI portions (e.g., 286*a-b*), a combined similarity score may be determined from the distances (e.g. differences) between the corresponding ROIs.

The change from the first to the second lighting condition may be based solely on image feature data derived from the ROI portion(s), wherein pixels of non-ROI portion(s) of the images may be excluded from the image feature data derivation and the comparison. However, it is also possible to derive image feature data from non-ROI portion(s) of the current image and the reference image and include it in a common similarity score, however given a lower weight than the image feature data derived from the ROI portion(s).

Furthermore, regardless of whether the image feature data is derived from the full image area or confined to one or more ROI portions, the processing device 24 may derive the image feature data by extracting the image feature data from the full resolution pixel data of the images. Alternatively, the processing device 24 may, generate down-sampled representations of the current image and the reference image (e.g., thereby generating low resolution "thumbnails") and derive the image feature data from the down-sampled representations. Various down-sampling approaches are possible, such as sub-sampling, sub-sampling preceded by pre-filtering to smoothen or blur the image (e.g., using a Gaussian or other blurring/smoothing kernel), interpolation (e.g., nearest-neighbor, bilinear, bicubic), etc.

A change from the second lighting condition to the first lighting condition in the scene 10 may be detected and handled in a manner analogous to the method described with reference above for handling the first case. FIG. 6 is a flow chart of a method for controlling the camera 20 responsive to detecting a change from the second lighting condition to the first lighting condition. The method steps of FIG. 6 may supplement the method steps of FIG. 4.

At S21, the processing device 24 obtains a (second) reference image of the scene 10. The second reference image may be obtained in a manner analogous to the first reference image (i.e. obtained at S12). However, the second reference image instead represents the scene 10 under the first lighting condition, as captured with the camera set to the second camera setting. Accordingly, the second reference image may typically be captured by the camera 20 (more specifically by the image capturing device 22 thereof) being set to the second camera setting, when the scene 10 is under the first lighting condition (e.g., the door 2 in FIG. 2 being closed or the artificial lighting 4 in FIG. 3 being switched off). That is, the reference image may be captured by the camera 20 when the scene 10 is under the first lighting condition, using the second camera setting. The second reference image may hence precisely reflect the scene 10 under the first lighting condition as seen or imaged by the camera 20 when set to the second camera setting.

The second reference image may like the first reference image be obtained as part of a configuration or calibration step of the method. That is, the scene 10 may intentionally be caused to present the first lighting condition, the camera 20 may be set to the second camera setting (thus overriding an automatic exposure algorithm of the camera 20), and an image of the scene 10 may be captured by the camera 20. The image may be determined as the second reference image. It is also possible to capture a plurality of images of the scene 10 using the second camera setting and determine the second reference image as an average image of the plurality of images. It is further envisaged that the second reference image alternatively may be obtained as an image of the scene 10 captured by another but similar camera (e.g. by a camera installer when deploying the camera for monitoring the scene 10) using corresponding camera settings, and then transferred to the memory 26 of the camera 20.

As shown in FIG. 1, the second reference image (possibly down-sampled) 34*c*, and/or image feature data 34*d* derived from the (down-sampled) second reference image may be stored in the memory 26 as reference data 34, for subsequent use in the method.

At S22, the camera 20 proceeds to monitor the scene 10. The method step S22 may in particular be performed after the lighting condition in the scene 10 (e.g. the scene 11 of FIG. 2 or the scene 12 of FIG. 3) has changed from the first to the second lighting condition and the camera 20 has been switched to the second camera setting. That is, the method step S22 may be performed as a sub-step of S15 of FIG. 4.

During the monitoring, the processing device 24 captures a sequence of images 28 and determines whether a change from the second lighting condition to the first lighting condition has occurred in the scene 10 (e.g. due to closing of the door 2 in FIG. 2 or switching off the artificial lighting 4 in FIG. 3).

Responsive to not detecting a change from the second to the first lighting condition, the monitoring may continue using the second camera setting.

Responsive to detecting a change from the second to the first lighting condition, the processing device 24, at S23, switches the camera 20 from the second camera setting to the first camera setting. The processing device 24 may retrieve the first camera setting 30 from the memory 26 and control or set each parameter of the camera 20 in accordance with the corresponding parameter of the first camera setting 30.

At S24, after switching the camera 20 to the first camera setting, the camera 20 continues monitoring the scene 10. As the scene 10 now is under the first lighting condition the images 28 captured of the scene 10 may thus be properly exposed.

The change from the second to the first lighting condition may be detected in a manner analogous to the flow chart of FIG. 5, by the processing device 24 performing the following method steps iteratively:

a) obtaining a current image captured with the camera 20 set to the second camera setting, b) deriving image feature data from the current image, c) comparing the current image feature data derived from the current image (interchangeably "the current image feature data") to second reference image feature data derived from the second reference image, d) determining whether the current image feature data matches the second reference image feature data.

In response to determining in step d) that the current image feature data does not match the second reference image feature data, the method proceeds by returning to step a) to obtain a next image captured with the camera 20 set to the second camera setting. Steps b)-d) may then be repeated using the next image as the current image.

In response to determining that the current image feature data does match the second reference image feature data, the processing device 24, at S24, determines that a change in the scene 10 from the second lighting condition to the first lighting condition has been detected and in response to detecting the change, switches the camera 20 to the first camera setting. The current image from which the change to the first lighting condition is detected may be denoted "second image". The "second image" may in analogy to the "first image" be a temporally first image captured after the change from the second to the first lighting condition, or correspond to or at least be an image captured within a relatively short time window after the change from the second to the first lighting condition (e.g., with a length corresponding to a relatively short sequence of frames, such as within 20 frames or less, 10 frames or less or 5 frames or less), to reduce a delay of detecting the change to the first lighting condition.

The second reference image feature data may, analogous to the first reference image feature data, have been previously derived from the (possibly down-sampled) second reference image and stored as second reference image feature data 34d in the memory 26 in connection with obtaining the second reference image. In this case, the second reference image feature data 34d may be retrieved from the memory 26. In case the (possibly down-sampled) second reference image 34c has been stored in the memory 26 (e.g., and not the second reference image feature data), the processing device 24 may prior to the comparison derive the second reference image feature data from the stored second reference image 34c.

The preceding discussion of the current image feature data, the first image feature data and the reference image feature data in connection with the flow charts of FIG. 4-5, applies correspondingly to the current image feature data, the second image feature data, and the second reference image feature data discussed in connection with the flow chart of FIG. 6. In particular, each of the aforementioned different sets of image feature data may comprise feature data of the same type(s). Furthermore, the comparison between the current/second image feature data and the second reference image feature data may be performed in a corresponding manner.

While reference above has been made to examples wherein the lighting condition changes between two steady state lighting conditions, it is contemplated that even in such environments, there may also be more gradual and smaller changes of lighting conditions from the respective steady state lighting conditions. Such smaller gradual changes may be reliably tracked by the automatic exposure algorithm, e.g. by an incremental and/or gradual change of one or more exposure-related parameters of the camera 20. Accordingly, the methods of the flow charts in FIG. 4-6 may be used in conjunction to the automatic exposure algorithm, to specifically quickly adapt to more abrupt changes between the first and second lighting condition, and vice versa, as discussed above. For instance, the processing device 24 may, in response to not detecting a change of lighting condition from the first to the second lighting condition, or vice versa, perform the automatic exposure algorithm to adapt the one or more exposure-related parameters of the camera 20 to a possible small gradual change of lighting condition in the scene 10. Hence, the method may at S15 continue monitoring of the scene 10 with the camera 20 initially set to the second camera setting, and thereafter use the automatic exposure algorithm to track gradual changes from the second lighting condition. The direct switching from the second to the first camera setting based on the second reference image may then be used after the lighting condition has gradually returned to the second lighting condition such that the camera settings have reverted to the second camera setting (controlled by the automatic exposure algorithm), whereafter the camera 20 may detect an abrupt change from the second to the first lighting condition based on the second reference image, as described above. Correspondingly, the method may at S24 continue monitoring of the scene 10 with the camera 20 initially set to the first camera setting, and thereafter use the automatic exposure algorithm to track gradual changes from the first lighting condition. The direct switching from the first to the second camera setting based on the first reference image may then be used after the lighting condition has gradually returned to the first lighting condition such that the camera settings have reverted to the first camera setting (controlled by the automatic exposure algorithm), whereafter the camera 20 may detect an abrupt change from the first to the second lighting condition based on the first reference image, as described above.

The person skilled in the art realizes that the present invention by no means is limited to the preferred embodiments described above. On the contrary, many modifications and variations are possible within the scope of the appended claims. For example, the example scenes discussed above have been assumed to be monitored by a stationary or fixed camera. However, the methods set out above may also be applied to a camera having a field of view of which is adjustable by a motorized pan and tilt arrangement, wherein the method may further comprise sweeping a field of view of the camera across an environment, between a set of fixed positions, wherein in each fixed position, the camera monitors a different scene within the environment, and performing the control method of the above method aspect for each scene.

Moreover, the approaches described above may be extended to handle additional lighting conditions. For instance, the camera 20 may, in addition to the first and second camera settings, determine a third camera setting suitable for monitoring the scene 10 under a third lighting condition, different from the first and second lighting conditions. For instance, the third lighting condition may correspond to a higher luminance level than both the first and the second lighting conditions, lower than both the first and second lighting conditions, or intermediate the first and second lighting conditions. As a non-limiting example, the third lighting condition may in the scene 12 of FIG. 3 correspond to the door 2 being open to a brightly lit adjoining space 3 and the artificial lighting 4 being switched on such that the scene 12 is under an even brighter lighting condition.

The third camera setting may be determined by the processing device 24 and stored in the memory 26 for later retrieval. The third camera setting may, analogous to the first and second camera settings, be determined using an automatic exposure algorithm when the scene 10 is under the third lighting condition. The third camera setting may comprise settings of the same exposure-related control parameters as the first and second camera settings.

The camera 20 may further obtain a third reference image representing the scene 10 under the third lighting condition, as captured with the camera 20 set to the first camera setting. The third reference image may typically be captured by the camera 20 (more specifically by the image capturing device 22 thereof) being set to the first camera setting, when the scene 10 is under the third lighting condition (e.g., the door 2 being open and the artificial lighting 4 in FIG. 3 being switched on). That is, the third reference image may be captured by the camera 20 when the scene 10 is under the third lighting condition, using the first camera setting. The third reference image may hence precisely reflect the scene 10 under the third lighting condition as seen or imaged by the camera 20 when set to the first camera setting.

The third reference image may, like the first and second camera settings and the first and second reference images, be obtained as part of a configuration or calibration step of the method. That is, the scene 10 may intentionally be caused to present the third lighting condition, the camera 20 may be set to the first camera setting (thus overriding an automatic exposure algorithm of the camera 20), and an image of the scene 10 may be captured by the camera 20. The image may be determined as the third reference image. It is also possible to capture a plurality of images of the scene 10 using the first camera setting and determine the third reference image as an average image of the plurality of images. It is further envisaged that the third reference image alternatively may be obtained as an image of the scene 10 captured by another but similar camera (e.g. by a camera installer when deploying the camera for monitoring the scene 10) using corresponding camera settings, and then transferred to the memory 26 of the camera 20.

Analogous to the above discussion, the third reference image may optionally be down-sampled, and/or image feature data derived from the (down-sampled) third reference image may be stored in the memory 26 as reference data 34, for subsequent use.

Accordingly, while monitoring the scene 10 with the camera 20 set to the first camera setting, the camera 20 (e.g., the processing device 24) may detect whether a change from the first lighting condition to the third lighting condition has occurred in the scene 10.

A change from the first to the third lighting condition may be detected analogously to the method steps shown in FIG. 5. That is, a change from the first to the third lighting condition may be detected by performing a comparison between: first image feature data derived from a first image of the scene captured with the camera 20 set to the first camera setting, after the change from the first to the third lighting condition; and third reference image feature data derived from the third reference image, to determine that the first image feature data matches the third reference image feature data.

Responsive to detecting the change (i.e. a match between the first image feature data and the third reference image feature data), the camera 20 may be switched from the first camera setting to the third camera setting and continue monitoring of the scene 10. As the scene 10 now is under the third lighting condition the images 28 captured of the scene 10 may be properly exposed.

The previous discussion of different types of image feature data, matching scores, similarity thresholds, and ROIs, in connection with the first and second reference image feature data applies correspondingly to the third reference image feature data.

The third reference image may in an analogous manner be supplemented with corresponding "shortcut" images to facilitate direct switching from one or more of: the third camera setting to the first camera setting (e.g., responsive to detecting a change from the third to the first lighting condition), the third camera setting to the second camera setting (e.g., responsive to detecting a change from the third to the second lighting condition), the second camera setting to the third camera setting (e.g., responsive to detecting a change from the second to the third lighting condition). It is further contemplated that the preceding example approaches may be augmented with one or more additional camera settings suitable for further lighting conditions (e.g., further steady-state lighting conditions), and corresponding reference/"shortcut" images to facilitate direct switching therebetween.

The invention claimed is:

1. A method for controlling a camera monitoring a scene, the method comprising:
   determining a first camera setting for monitoring the scene under a first lighting condition, and a second camera setting for monitoring the scene under a second lighting condition different from the first lighting condition;
   obtaining a reference image, wherein the reference image represents the scene under the second lighting condition, as captured with the camera set to the first camera setting;
   while monitoring the scene with the camera set to the first camera setting, detecting a change in the scene from the first lighting condition to the second lighting condition, wherein detecting said change from the first to the second lighting condition comprises performing a comparison between:

first image feature data derived from a first image of the scene captured with the camera set to the first camera setting, after said change from the first to the second lighting condition, and reference image feature data derived from the reference image, to determine that the first image feature data matches the reference image feature data; and responsive to detecting the change, switching the camera from the first camera setting to the second camera setting and continuing monitoring of the scene.

2. The method of claim 1, wherein the first and the reference image feature data each comprises exposure-related data.

3. The method of claim 2, wherein the exposure-related data comprises statistics of pixel values derived from the first image and the reference image, respectively, wherein the statistics comprises one or more of: a representative pixel value for the first image or the reference image, such as an average or median pixel value, a contrast, a frequency distribution of pixel values.

4. The method of claim 1, wherein the first and reference image feature data comprises pixel values of spatially corresponding pixels of the first and reference image.

5. The method of claim 1, wherein the first image feature data and reference image feature data is derived from the first and reference image, respectively, by down-sampling the respective image and extracting the first and image feature data from the respective down-sampled image.

6. The method of claim 1, further comprising deriving the reference image feature data and storing the reference image feature data, wherein performing the comparison comprises comparing the first image feature data to the stored reference image feature data.

7. The method of claim 1, wherein the reference image is captured of the scene under the second lighting condition, with the camera set to the first camera setting.

8. The method of claim 1, wherein the scene comprises one or more regions of interest, each depicted in a respective one of one or more portions of the first image and the reference image, and wherein the first and reference image feature data is derived from at least the one or more portions of the first image and the reference image, respectively.

9. The method of claim 8, wherein the one or more regions of interest comprises an object, such as a door opening or artificial lighting, having a first state and a second state, wherein the first state is associated with the first lighting condition and the second state is associated with the second lighting condition.

10. The method of claim 1, wherein the first and second lighting condition corresponds, respectively, to a first and a second steady-state lighting condition with different luminance levels.

11. The method of claim 1, wherein the first and second camera settings comprise a setting of one or more exposure-related control parameters of the camera.

12. The method of claim 1, wherein the first and second camera settings comprise a setting of one or more of: shutter speed, aperture, ISO value, camera lighting, and an IR filter state.

13. The method of claim 1, further comprising:

obtaining a second reference image, wherein the second reference image represents the scene under the first lighting condition, as captured with the camera set to the second camera setting;

while monitoring the scene with the camera set to the second camera setting, detecting a change in the scene from the second lighting condition to the first lighting condition, wherein detecting said change from the second to the first lighting condition comprises performing a comparison between:

second image feature data derived from a second image of the scene captured with the camera set to the second camera setting, after said change from the second to the first lighting condition, and second reference image feature data derived from the second reference image, to determine that the second image feature data matches the second reference image feature data; and responsive to detecting the change, switching the camera from the second camera setting to the first camera setting and continuing monitoring of the scene.

14. A camera comprising a processing device configured to perform the method of claim 1.

15. A computer program product embedded in a non-transitory computer-readable medium comprising computer program code portions configured to perform a method for controlling a camera monitoring a scene, when executed by a processing device, the method comprising:

determining a first camera setting for monitoring the scene under a first lighting condition, and a second camera setting for monitoring the scene under a second lighting condition different from the first lighting condition;

obtaining a reference image, wherein the reference image represents the scene under the second lighting condition, as captured with the camera set to the first camera setting;

while the camera is set to the first camera setting and monitors the scene, detecting a change in the scene from the first lighting condition to the second lighting condition, wherein detecting said change from the first to the second lighting condition comprises performing a comparison between:

first image feature data derived from a first image of the scene captured with the camera set to the first camera setting, after said change from the first to the second lighting condition, and reference image feature data derived from the reference image, to determine that the first image feature data matches the reference image feature data; and responsive to detecting the change, causing the camera to switch from the first camera setting to the second camera setting and continue monitoring of the scene.

* * * * *